(12) United States Patent
Leow et al.

(10) Patent No.: US 12,272,940 B2
(45) Date of Patent: Apr. 8, 2025

(54) PROTECTION CIRCUIT FOR AN ELECTRICAL APPLIANCE

(71) Applicant: Dyson Technology Limited, Wiltshire (GB)

(72) Inventors: Yuen Kee Leow, Singapore (SG); Weifu Yu, Singapore (SG); Shiyi Chen, Singapore (SG); Aaron Qingwei Cai, Singapore (SG); Kai Wang, Singapore (SG)

(73) Assignee: Dyson Technology Limited, Malmesbury (GB)

( * ) Notice: Subject to any disclaimer, the term of this patent is extended or adjusted under 35 U.S.C. 154(b) by 212 days.

(21) Appl. No.: 18/008,218

(22) PCT Filed: Apr. 22, 2021

(86) PCT No.: PCT/GB2021/050972
§ 371 (c)(1),
(2) Date: Dec. 5, 2022

(87) PCT Pub. No.: WO2021/250369
PCT Pub. Date: Dec. 16, 2021

(65) Prior Publication Data
US 2023/0246434 A1 Aug. 3, 2023

(30) Foreign Application Priority Data
Jun. 12, 2020 (GB) ...................................... 2008956

(51) Int. Cl.
*H02H 5/04* (2006.01)
(52) U.S. Cl.
CPC ...................................... *H02H 5/04* (2013.01)
(58) Field of Classification Search
CPC .............................................. H02H 5/04–048
See application file for complete search history.

(56) References Cited

U.S. PATENT DOCUMENTS 5,563,759 A 10/1996 Nadd
6,112,135 A 8/2000 Peterson et al.
(Continued)

FOREIGN PATENT DOCUMENTS

| CN | 108736440 A | 11/2018 |
| JP | 63-059718 A | 3/1988 |

(Continued)

OTHER PUBLICATIONS

Search Report received for GB Application No. 2008956.1, mailed on Nov. 27, 2020, 1 page.
(Continued)

*Primary Examiner* — Jared Fureman
*Assistant Examiner* — Christopher J Clark
(74) *Attorney, Agent, or Firm* — Tucker Ellis LLP

(57) ABSTRACT

A protection circuit for an electric appliance that is configured to control power supply to an associated electrical component of the appliance such as a heating device, lamp or motor in the event that unsafe conditions are detected. The protection circuit includes a first comparator module configured to compare an operating parameter input signal to a threshold value and to output a first control signal to a first switching circuit configured to control power flow to the associated electrical component. The first comparator module is configured to receive an enable/disable signal from a first state-change latching device, which is responsive to a state change of the first control signal from the first comparator module, in response to which the state-change latching device changes the enable/disable signal from an enable state to a disable state thereby to set the first control signal into an off state.

14 Claims, 5 Drawing Sheets

(56) References Cited

U.S. PATENT DOCUMENTS

| | | |
|---|---|---|
| 6,597,556 B1 | 7/2003 | Michel et al. |
| 8,248,260 B1 | 8/2012 | Pope |
| 8,837,103 B2 | 9/2014 | Weiher |
| 9,366,583 B2 | 6/2016 | Xiang et al. |
| 10,291,011 B2 | 5/2019 | Redler |
| 2007/0210072 A1 | 9/2007 | Yabe |
| 2008/0310068 A1 | 12/2008 | Yabe et al. |
| 2015/0085540 A1 | 3/2015 | Huang et al. |
| 2017/0374710 A1 | 12/2017 | Heubach et al. |
| 2018/0294637 A1* | 10/2018 | Cass ................. G01K 7/22 |
| 2020/0144808 A1* | 5/2020 | Yamane ............. H02H 5/042 |

FOREIGN PATENT DOCUMENTS

| | | |
|---|---|---|
| JP | H10-157446 A | 6/1998 |
| JP | 11-355953 A | 12/1999 |
| JP | 2003-157671 A | 5/2003 |
| JP | 2006-058510 A | 3/2006 |
| JP | 2016-045718 A | 4/2016 |

OTHER PUBLICATIONS

International Search Report and Written Opinion received for PCT Patent Application No. PCT/GB2021/050972, mailed on Jul. 22, 2021, 7 pages.

\* cited by examiner

PROTECTION CIRCUIT FOR AN ELECTRICAL APPLIANCE

CROSS-REFERENCE TO PRIOR APPLICATION

This application is a § 371 National Stage Application of PCT International Application No. PCT/GB2021/050972 filed Apr. 22, 2021, which claims the priority of United Kingdom Application No. 2008956.1, filed Jun. 12, 2020, each of which are herein incorporated by reference in their entirety.

FIELD OF THE INVENTION

The invention relates generally to protection control circuitry for use in an appliance particularly, though not exclusively, to a personal care appliance such as a hair dryer or hair curler and the like. The invention also relates to an appliance incorporating such protection control circuitry.

BACKGROUND

Electrical appliances that incorporate electrical heaters are common about the average home and may include personal grooming devices such as hair dryers, hair straighteners, but also space heaters. In order to make such appliances safe to use, household electrical appliances are governed by safety standards which dictate how such appliances should operate in the event of a fault. An example of such a standard is IEC/EN/UL 60730.

A typical requirement is for appliances to incorporate protection control functionality to ensure that electrical power to the appliance is disabled in the event of a safety fault being identified. Moreover, the disabling of the power supply should be non-resettable control such that the power supply remains disabled even after it is power cycled. There is also no way the user of the device is able to reset the appliance in order to restore operation.

In an appliance that incorporates an electrical heater, a non-resettable safety function may be provided by a thermal cut-off that makes use of a thermal fuse which is operable to disable the appliance when its operational temperature reaches an unsafe level. Examples of such electrical appliances that could incorporate such safety functionality are described in WO2015/005024 A1 and WO2018/130832 A1.

One design challenge associated with these electrical appliances is to make them more ergonomic by reducing their weight and size so that they are more easily held and operated by the user. This compromises the ability to design their electrical control systems to incorporate additional safety devices such as thermal fuses in a reduced packaging volume. An alternative approach is therefore desirable which provides the same safety functionality that meets the relevant safety standard requirements but in a smaller package. It is against this background that the embodiments of the invention have been devised.

SUMMARY OF THE INVENTION

According to a first aspect of the invention, there is provided a protection circuit for an electric appliance. The protection circuit is configured to control power supply to an associated electrical component of the appliance such as a heating device, lamp or motor in the event that unsafe conditions are detected such that continued power supply could be hazardous. The protection circuit comprises a first comparator module configured to compare an operating parameter input signal to a threshold value and to output a first control signal to a first switching circuit configured to control power flow to the associated electrical component. The first comparator module is configured to receive an enable/disable signal from a first state-change latching device, wherein the first state-change latching device is responsive to a state change of the first control signal from the first comparator module, in response to which the state-change latching device changes the enable/disable signal from an enable state to a disable state thereby to set the first control signal into an off state and thereby lock the appliance in a non-working safe state.

Advantageously, the protection circuit provides a 100% hardware solution for a permanent electrical cut-out system as used in the appliance and as such the circuit does not make use of a conventional thermal fuse and, moreover, does not require the implementation of safety-critical software. It is worth emphasising that the protection circuit will still cut-out the system even after it is power cycled. The protection circuit of the invention therefore provides a particularly cost efficient and space efficient solution which is well suited to unconventional electrical appliances with smaller form factors.

A power cycle refers to the appliance being turned off and then on. In the event that the protection circuit is utilised, and the first control signal is set in an off state, when a user subsequently attempts to switch the appliance on it will not function as it is disabled and locked into the non-working state. There is the possibility of the appliance being serviced, the safety issue resolved and the servicing technician resetting the latch but this requires disassembly of the appliance.

In one example, the state-change latching device may be a digital potentiometer having a wiper position that provides the enable/disable signal. In some examples, the enable/disable signal may be configured to also provide the predetermined threshold against which the operating parameter input signal is compared.

As part of the protection circuit, a monitor or 'control' module may be configured to monitor the first control signal of the first comparator module and to output a triggering input to the state-change latching device that is responsive to the state of the first control signal.

The first state-change latching device may include a latching mechanism that is activated by the triggering input. In this way, the control module is able to control the status of the latching device and, therefore, control the status of the control signal that is input to the switching circuit. The latching mechanism may be configured to change state upon detecting the triggering input being in a triggering state for a predetermined time period. For example, the latching mechanism may be implemented by a wiper position of a digital potentiometer which reduces in value when a "decrement wiper position" pin is energised by the triggering signal. The triggering signal may be energised for a predetermined time period in order to ensure that the wiper position is decremented to its lowest value.

The first state-change latching device may have a memory module that saves the state of the latching mechanism. For example, the control module may control the memory module to save the state of the latching mechanism by outputting a save input of a predetermined duration. Once the state of the latching mechanism is saved in the memory module, the appliance will remain in a non-working state even after the appliance is power cycled.

In one example, the first comparator module may include a comparator that outputs a logic high signal to a first logic element when the operating parameter input signal exceeds the threshold value, and wherein the first logic element outputs the first control signal as a logic high state when the first comparator output signal and the enable/disable signal are the same logic state.

In another example, the first comparator module may include a comparator that outputs the first control signal as a logic high state when the operating parameter input signal exceeds the threshold value, and wherein the threshold value may be provided by the enable/disable signal of the first state-change latching device when that signal is in an enable state.

Conveniently, the protection circuit may be configured to be fault tolerant so that any signal fault in the circuit results in the switch circuit failing to a safe state, thereby cutting power supply to the associated electronic component. As such, the protection circuit may further comprise a second comparator module configured to receive the operating parameter input signal and to compare operating parameter input signal to a threshold value and, in response, to output a second control signal to a second switching circuit configured to control power flow to the associated electrical appliance, wherein the second comparator module is configured to receive an enable/disable signal from a second state-change latching device. The second state-change latching device may also be responsive to a state change of the second control signal from the second comparator module, in response to which the second state-change latching device changes the enable/disable signal from an enable state to a disable state thereby to lock the second control signal into an off state.

Expressed in another way, the protection circuit comprises first and second circuit legs each of which functions in a very similar way to control power flow to the associated switch circuit.

The first switching circuit may be connected to a power control relay, and wherein the power control relay is connected to a power supply. Likewise, the second switching circuit may be connected to the power control relay. The power control relay may be configured to disable the power supply when one or both the first switching circuit and the second switching circuit operate to de-energise the relay Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The above and other aspects of the invention will now be described, by way of example only, with reference to the accompanying drawings, in which.

In the drawings, the same reference numerals are used to denote features that are common across drawings.

SPECIFIC DESCRIPTION

Figure 1:
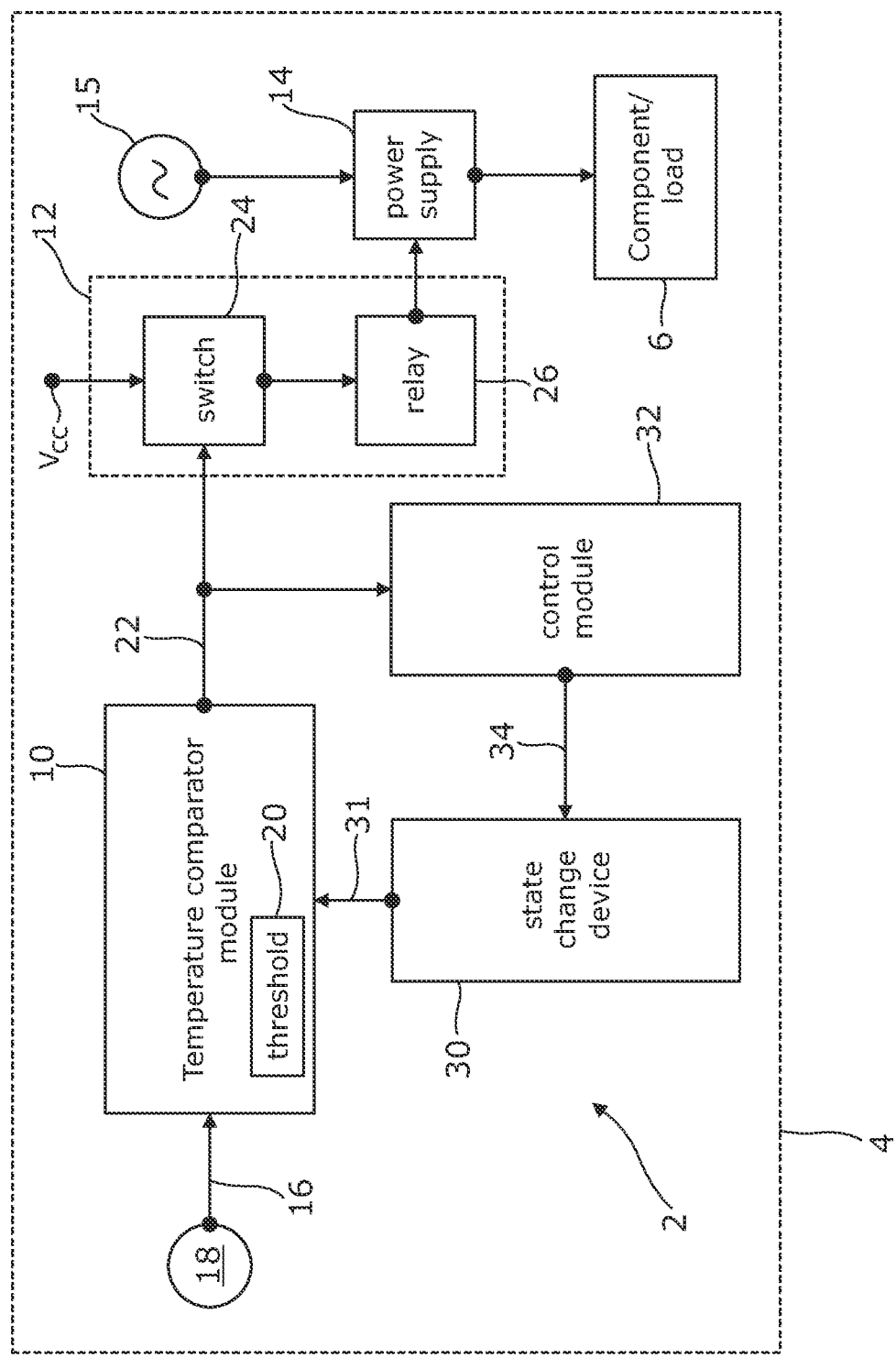
FIG. 1 is a schematic diagram of a circuit configuration in accordance with an example of the invention.

With reference to FIG. 1, a protection circuit 2 includes various components that are installed within an electrical appliance 4 in order to provide that appliance with suitable safety functionality. In the examples that follow, the protection circuit 2 provides control over the power that is supplied to a component 6 of the electrical appliance 4. That component 6 may be a lamp, motor or a heating device, for example, although these are just indicative of the types of component that are relevant to this discussion. By controlling the power supplied to the component 6, that component may be disabled in circumstances where it is considered to be unsafe for the component to carry on functioning.

In the discussion that follows, the component 6 can be considered to be a heater device, although either term may be used interchangeably. Such a heater device may be a wire-element type heater device such as found in typical hair dryers or a ceramic-element type heating device which are commonly found in hair straighteners and hair curling tongs, for example, but also in hair dryers produced by the Applicant.

It should be noted that the circuit schematic in FIG. 1 is at a high functional level to provide an introduction into the architecture and the functionality provided by the protection circuit 2. Later drawings and associated discussion provide a more detailed understanding of the specific circuit components used in the protection circuit.

In overview, the protection circuit 2 comprises a comparator module 10 which is in communication with a switching circuit 12. The switching circuit 12 controls the operation of a power supply 14 which supplies voltage/current to the heater device 6.

The comparator module 10 receives an input signal 16 from a temperature sensor 18 and compares the input signal 16 to a predetermined threshold value 20. The input signal 16 may be a suitably calibrated voltage or current that is output by the temperature sensor 18 in proportion to the sensed temperature, as would be understood by the skilled person. Although not shown here, the temperature sensor 18 may be integrated into the appliance 4 in a way which ensures accurate measuring of the parameter in question. For example, the temperature sensor 18 may be mounted next to or embedded in the heating elements of the heating device. It is also envisaged that that the temperature sensor signal 16 could be provided through current feedback of the heater device 6. Note that in this example the comparator receives a signal from a temperature sensor, but in other applications the input signal may represent another operating parameter.

It should be appreciated that the predetermined threshold value 20 may be a stored value or it may also be provided by an input signal. In FIG. 1, the predetermined threshold value 20 is shown as a single value, but other checks may be performed. For example, an additional check may be made to ensure that the input temperature signal is within an acceptable voltage range.

The temperature comparator module 10 provides an output signal 22 to the switching circuit 12. In this example the output signal 22 is a digital output signal that may be in a high or a low state, thereby to activate or deactivate the switching circuit 12 and, thus, control the power flow to the heater device 6 accordingly. Here, the switching circuit 12 includes a switch device 24 which is operably connected to a relay 26 to control its operational state. The relay 26 therefore provides a reliable mechanism through which the power flow from the power supply 14 to the heater device 6 can be controlled.

As discussed above, in order to comply with safety regulations it is important that a protection circuit is able to disable the power supply to the component 6 in such a way that the user is unable to restore operation of the appliance 4 even after the appliance is power cycled. To this end, therefore, the protection circuit 2 includes a state-change latching device 30 that is interfaced with the comparator module 10. The state-change latching device 30 is configured to be responsive to the output signal 22 of the comparator module 10 and has the function to latch the output signal 22 into a low state if that signal transitions from a high state to a low state by issuing an enable/disable signal 31 to the comparator module 10. For example, if the comparator module 10 detects a temperature at the sensor 18 that exceeds the predetermined threshold 20, thereby indicating a potentially hazardous condition for the appliance 4, the output signal 22 will transition from a high state to a low state in order to configure the switching circuit 12 to disable power to the heater device 6. In response, the state-change latching device 30 will detect the signal state transition and will configure the comparator module 10 so that the output signal 22 remains in a low state even if the sensed temperature reduces below the predetermined temperature threshold 20. To this end, the state-change latching device 30 sets the enable/disable signal 31 into the disable state. This functionality therefore renders the appliance in a safe state so that appropriate investigations can be carried out without the user turning the appliance back on.

As shown in FIG. 1, the state-change latching device 30 operates under the control of a control module 32. The control module 32 receives the output signal 22 from the temperature comparator module 10 and provides appropriate control inputs 34 to the state-change latching device 30. The state-change latching device 30 and the control module 32 are depicted as separate functional blocks in FIG. 1, but it should be noted that this is for convenience only and, accordingly, the state-change latching device 30 and the control module 32 may be a single hardware module. It should be noted that all of the circuit components described here as part of the protection circuit are preferably configured as hardware components. As such, those hardware components may be configured as separated components on a circuit board or, more preferably, those hardware components may form part of an integrated circuit. This would mean that the functionality provided by the protection circuit can be realised in a particularly space-efficient package which can be integrated within existing PCB layouts of the appliance. This is to be compared with existing solutions which tend to be based around thermal fuses which take up a significant amount of packaging space within an appliance and so do not lend themselves to personal appliances such as hair dryers having novel layouts with restricted packaging volumes.

Another benefit is that the hardware-based solution provided by the examples of the invention discussed here do not require the implementation of a software processing environment which typically also come with significant requirements for safety-level certification.

Figure 2:
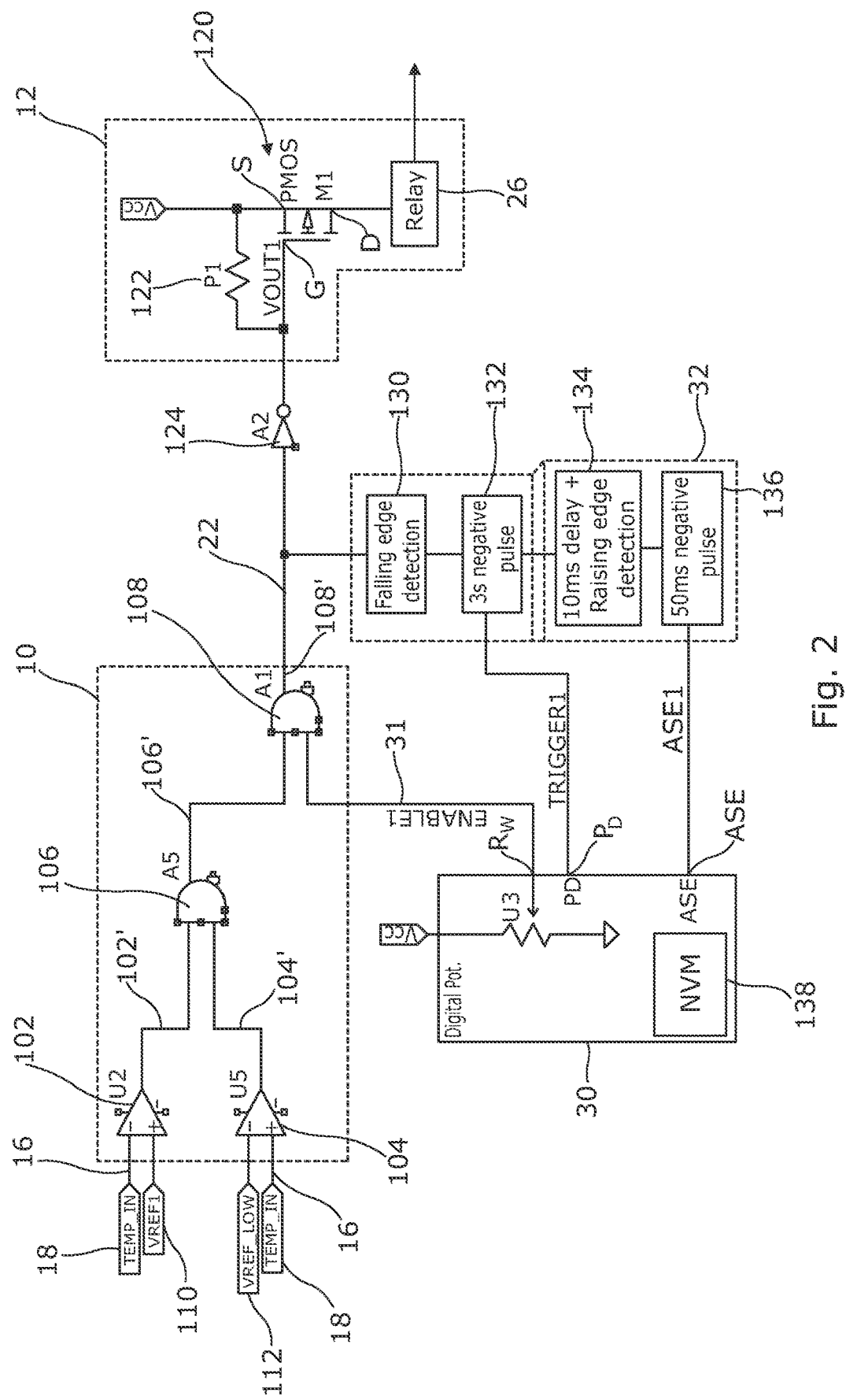
FIG. 2 is a more detailed schematic diagram of the circuit configuration shown in FIG. 1.

Having described the broad functionality of the protection circuit 2, a more detailed discussion now follows with respect to FIG. 2 in which one possible implementation example is shown.

In FIG. 2, the comparator module 10 comprises a plurality of logic gates which are interfaced with the enable/disable signal 31 from the state-change latching device 30. As can be seen, here the state-change latching device 30 is embodied as a digital potentiometer and the enable/disable signal 31 is provided by the wiper output of the digital potentiometer, as will become more apparent in the discussion that follows.

In overview, the comparator module 10 comprises a pair of comparators, labelled 102 and 104, respectively, and a pair of AND gates, labelled 106 and 108, respectively. The comparators 102,104 provide the temperature comparison functionality provided by the comparator module 10. Referring firstly to the first comparator 102, it receives a temperature signal 16 from the temperature sensor 18 and a voltage reference signal 110 which implements the predetermined temperature threshold 12 as discussed above. So, it will be appreciated that the comparator 102 provides a temperature comparison function at a single temperature value.

In order to provide a further degree of value checking, the second comparator 104 compares two input values: the temperature signal 16 from the temperature sensor 18 and a voltage reference signal 112 that is indicative of a low limit value. The skilled person would appreciate that this value may be set as a value that would be indicative of an error reading, for example a negative temperature value. For example, the indicative temperature value may be −150 degrees C., which may correspond to a signal voltage of 0.6v or less.

Together, therefore, the two comparators 102,104 check that the temperature signal is within a predetermined range as determined by the two reference voltage values 110,112.

The outputs 102' and 104' of both comparators 102,104 are fed as input signals into the first AND gate 106 which outputs a signal 106' to the second AND gate 108. The output signal 106' will therefore be logic high when the outputs of both comparators are also at a logic high state, indicating that the sensed temperature is within an acceptable temperature range as defined by the voltage reference values 110,112.

The second AND gate 108 receives the output signal 106 from the first AND gate 106' and also the enable/disable signal 31 from the state-change latching device 30 (from now on referred to as a 'digipot' for brevity). Therefore, the second AND gate 108 will configure its output signal 108 into a logic high state only when both of its input signals are in the logic high state. It should be noted that the output signal 108' of the second AND gate is equivalent to the output signal 22 of the comparator module 10 as discussed above with reference to FIG. 1, and will be referred to as such from now on.

As discussed, the output signal 22 is input to the switching circuit 12 which, as can be seen includes the switch device 24 comprising a semiconductor switch 120 and a pull-up resistor 122 connected between its source and gate terminals, whilst the drain terminal of the semiconductor switch 120 is connected to a coil contact of the relay 26. Here the semiconductor switch 120 is shown as a PMOS, although other switch configurations could be used.

From the above, it will be appreciated that the output signal 22 is connected to the gate terminal of the switch 120 via an inverter or NOT gate 124. Therefore, when the output signal 22 from the comparator module 10 is at a logic high state, the inverter 124 converts the signal to a logic low state which means the gate terminal is at a low voltage, therefore putting the semiconductor switch 120 into the ON state. This means that current is able to flow between the source and the drain of the semiconductor switch 120 thereby energising the relay 26 and ensuring that the component 6 remains in the enabled state.

As discussed above, if the sensed temperature is not within the acceptable range defined by the voltage references, then the two AND gates 106,108 will switch their outputs to logic low, which will mean that the output signal 22 from the comparator module 10 transitions from a logic high state to a logic low state, thereby turning off the switch unit 120 and de-energising the relay 26.

In FIG. 2, the details of the digipot 30 and the control module 32 are shown more clearly. As can be seen the enable/disable signal 31 is generated by virtue of the fact that the 'wiper' pin (Rw) is connected to the second AND gate 108. As an initial condition, in which the protection circuit 2 is operating in an enabling condition due to the sensed temperature being within a permitted range (or at least below the predetermined temperature threshold) the voltage on the Rw pin will be at its highest position, which corresponds to the input voltage pin Vcc of the digipot.

The control module 32 operates the digipot 30 in order to pull the Rw pin from its highest position to its lowest position, which has the effect of changing the enable/disable signal from an enable state to a disable state. Once this has happened the control module 32 operates the digipot to configure the Rw pin into the lowest position, thereby maintaining the enable/disable signal into the disable state.

In FIG. 2, an example of the functionality implemented in the control module 32 can be observed. As has been discussed, the control module 32 is responsive to the control signal 22 from the comparator module 10 transitioning from a logic high state to a logic low state. For this purpose, the control module 32 includes a falling edge detector 130 which triggers the operation of a negative pulse generator 132. The negative pulse generator 132 sends a logic low signal to the Pd pin of the digipot 30 which decrements the wiper position from its current highest value. Note that pin assignments for digital potentiometers may vary and in other devices the Pd pin may also be known as the Ud pin or, more generally, as the pin which decrements the position of the wiper. The skilled person would be aware of such other pin assignments. Examples may be UC, or 'Up Control' for the function of increasing the wiper position, and DC or 'Down Control' for the function of decreasing the wiper position. The skilled person would also understand the different types of digital potentiometer available commercially and that any of these types may be used in this application, suitably configured.

The duration of the negative pulse that is generated by the negative pulse generator 132 is configured to be sufficient to pull the value of the Rw pin from its highest position to the lowest position, and this duration may vary depending on the specification of the digipot that is used, and particularly the number of steps between the highest and lowest position of the wiper. However, for present purposes, the negative pulse can be considered to be within the order of 3 seconds, which corresponds to a 32-step wiper. To provide further context, the enable/disable signal is configured to provide a digital input, which, given a circuit voltage Vcc of 5v, provides that the enable/disable is positive at a value of e.g. 0.7*Vcc and negative when at e.g. 0.3*Vcc. For a 32-step potentiometer therefore, the enable/disable signal is positive when greater than 3.5V, corresponding to wiper position 23, and negative when less than 1.5V, corresponding to wiper position 9.

Once the wiper position of the digipot 30 has been drawn down to a low state, thereby triggering the enable/disable signal to transition to the disable state, the wiper position must be set or 'saved' into that position. The control module 32 achieves this by a delay block 134 and a further negative pulse generator block 136.

As shown, the negative pulse signal generated by the negative pulse generator 132 is also input to the delay block 134. The delay block 134 is responsive to the negative pulse signal transition from the low state to a high state, in this example after the 3 second period has elapsed. Once the transition has been detected, the delay block implements a short delay period, in this case 10 ms, and then triggers the further negative pulse generator 136 to generate a negative pulse signal that is input to an ASE pin of the digipot. The further negative pulse generator 136 generators a negative pulse of a predetermined duration in order to hold the ASE pin at a low state for sufficient time for the digipot 30 to save the wiper position into a non-volatile memory (NVM) 138 of the digipot 30. Once the low state of the wiper position is saved into NVM 138, the enable/disable signal 31 will remain in the disable state thereby maintaining the switching circuit 22 in a disabled state.

It should be noted at this point that the specific functionality of the control module 32 is configured to operate the digipot in the required manner and so other digipots may require different control functionality. Specifically, the 10 ms delay implemented by the delay block 134 is configured to ensure that the negative pulse signal has definitely transitioned back to a hight state before triggering the further negative pulse generator 138 to generate the NVM save signal at the ASE pin, since the save function will only be successful if the Pd pin is high at the point the save function is implemented.

From the above discussion, it will be appreciated that the circuit configuration of FIG. 2 achieves an elegant hardware-implementation for a permanent protective function for an appliance that must be rendered in a safe sate in the event that a critical parameter is judged to be exceeding a threshold. Since the solution is a hardware implementation, it is very space efficient and can be integrated into existing PCB space within the appliance.

Figure 3:
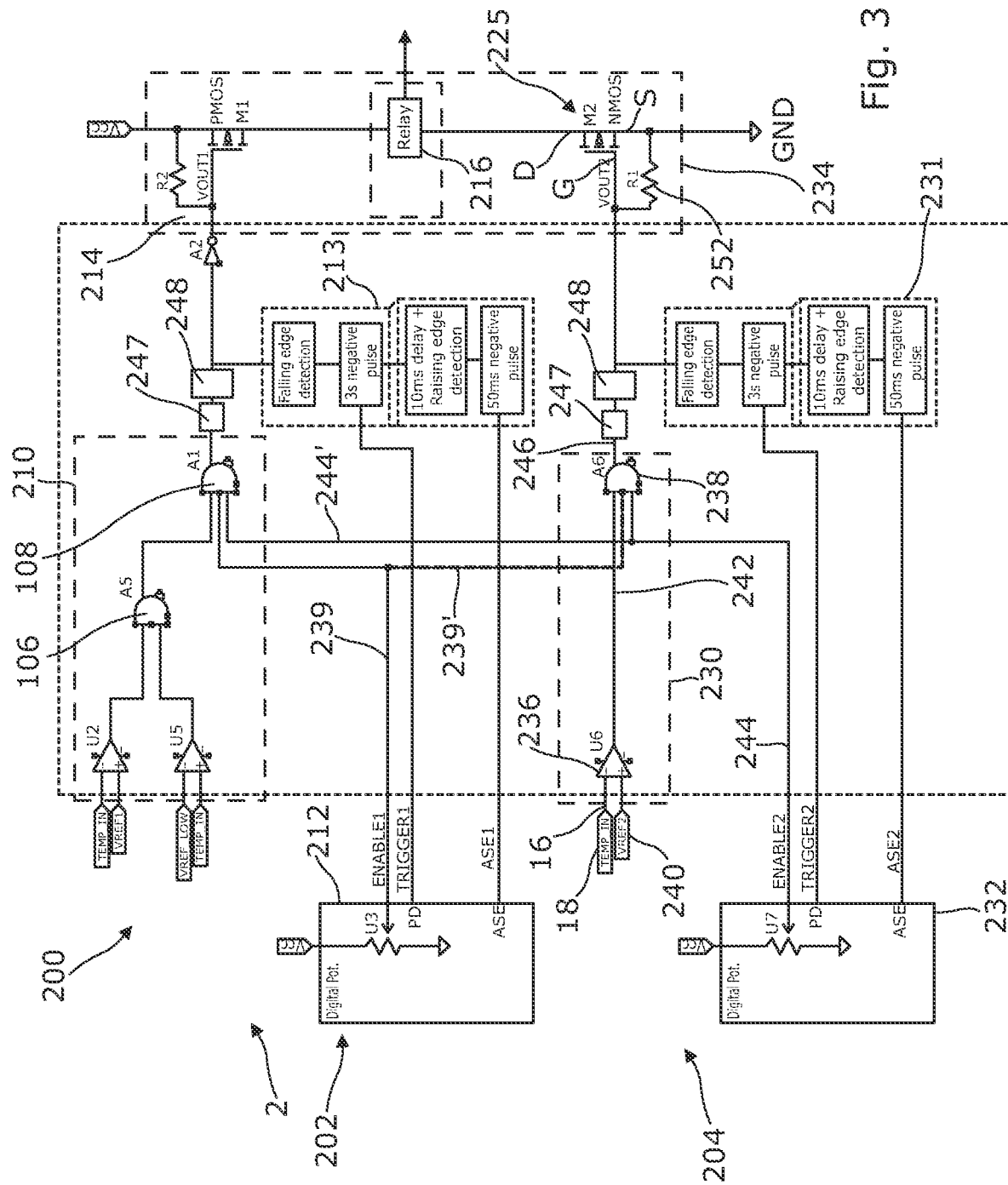
FIG. 3 is a schematic diagram of the circuit configuration shown in FIG. 2, but including further circuitry that provides fault tolerance.

Turning now to FIG. 3, there is shown an example of an enhanced protection circuit 200 which has commonality with the circuit topology discussed above in relation to FIG. 2. In FIG. 3, the protection circuit 2 of FIG. 2 can be seen in the upper portion of the diagram, and a replicated circuit can be seen in the lower portion of the diagram.

For the purposes of this discussion, the upper circuit portion will be referred to as the first circuit leg 202 and the lower circuit portion will be referred to as the second circuit leg 204. It should be noted at this point that the configuration and operation of the first circuit leg 202 is as discussed above with reference to FIG. 2, so a further discussion will not be repeated here.

Compared to the protection circuit of FIG. 2, the protection circuit 200 in FIG. 3 provides fault tolerance since the functionality of the first circuit leg 202 is replicated by the second circuit leg 204. Therefore, if one of the circuit legs has a fault such that it is unable to de-energise the relay 26, the other circuit leg is able to function correctly to still achieve de-energisation of the relay and, therefore, cutting the power supply to the heater device 6.

In overview, the first circuit leg 202 comprises a first comparator module 210, a first state-change latching device 212, a first control module 213, and a first switching circuit 214 which is connected to a relay 216. The operation of these circuit elements is the same as described above in relation to the protection circuit 2 of FIG. 2.

The second circuit leg 204 is very similar to the first circuit leg 202 and, as such, comprises a second comparator module 230, a second control module 231, a second state-change latching device 232 and second switching circuit 234. Further discussion of these circuit components will now follow.

Notably, the second comparator module 230 is somewhat simplified relative to the first comparator module 210 and has a single comparator element 236 and a single AND gate 238. The comparator element 236 receives a temperature signal 16 from the temperature sensor 18 and a voltage reference signal 240 which defines a temperature threshold. In effect, therefore, the comparator element 236 implements a similar temperature checking function as the comparator module 10 as discussed above in relation to the protection circuit of FIG. 2 since the comparator element 236 receives the same temperature signal and the same voltage reference.

When the appliance 2 is operating normally, and the temperature signal 16 from the temperature sensor 18 is below the predetermined threshold, the output signal 242 of the comparator element 236 is logic high and is fed into the AND gate 238. In the same way as the first circuit leg 202, in the second circuit leg 204 the AND gate 238 also receives an enable/disable signal 244 from the second state-change latching device 232 which is in a logic high state in the initial condition.

Optionally, the AND gate 238 may also receive enable/disable signal 239 from the state-change latching device 212 of the first circuit leg 202, as shown in this figure by the dashed line labelled 239'. Likewise, the enable/disable signal 244 from the second state-change latching device 232 may also be input to the first comparator 210, as shown by the dashed line 244'. This configuration ensures that either of the state-change latching devices 212,232 is able to disable operation of the relay 26 and so in effect improves the fault tolerance of the circuit. Moreover, since operation of either of the state change latching devices 212,232 triggers the AND gates, a fault in either device will not affect the result as the two state-change latching devices 212,232 are effectively cross linked so triggering of either one will cause operation of both switch devices thereby de-energising the relay. This guards against tolerances in the comparators, for example, tripping only one of the state-change latching devices 212,232 as in that circumstance both of the and gates 108,238 will be triggered.

When the appliance 2 is operating normally, the input signals into the AND gate 238 will be logic high, and so output signal 246 from the AND gate 238 will also be logic high.

The output signal 246 is input into the second switching circuit 234 which, in the same way as the first switching circuit 214 is connected to the relay 216. Optionally, and as shown here, the output signal 246 may be filtered by filter element 247 which applies a suitable time constant to the output signal 246 in order to filter out any temporary fluctuations in the signal. As a further option, a latch element 248 may be included in the circuit, and in FIG. 3 the latch element 248 is shown positioned after the filter element 247. An advantage of the latch element 248 is that in the case of the output of the comparators 108,238 being pulled high before the 3 second period has expired, which is required to activate the state-change latching devices 212,232, the latch element 248 ensures that the signal remains in a low state thereby ensuring that the signal is at a low state for a sufficient period for the state-change latching devices 212, 232 to change to a low state enable/disable signal.

Here, each of the switching circuits 214,236 must provide a positive voltage to the relay 216 in order to energise it and, therefore, also to enable power supply to the heater device (not shown in FIG. 3). In the second circuit leg 204, the second switching circuit 234 includes a semiconductor switch device 250 which is shown as a NMOS transistor, having its source terminal S connected to ground GND, its drain terminal D connected to the relay 216 and the gate terminal G receiving the output signal 246 from the AND gate 238. A pull-down resistor 252 is connected between the gate terminal G and ground GND in order to ensure that a logic low signal is at ground potential.

With this configuration, it will be appreciated that when the output signal 246 from the AND gate 238 is logic high, this will put the gate terminal G of the switch device 250 into a high state which will turn on conduction between the drain terminal D and the source terminal S thereby energising the coil connection of the relay 216 to which it is connected. Together with the first switching circuit 224 being connected to the other coil connection of the relay 216, the relay 216 is energised when both switching circuits are in the active state.

Conversely, if the output signal 246 from the AND gate 238 transitions to a logic low state, the pull-down resistor 252 ensures that the gate terminal G is at a ground state and so the switch device is turned off, thereby de-energising the relay 216.

It should be noted that the operation of the second control module 231 and the second state-change latching device 232 is identical to the operation of the equivalent components that have been described about with respect to the protection circuit 2 in FIG. 2, and, thus, the first circuit leg 202. Therefore, further description will not be provided here.

From the above discussion, it will be appreciated that the first circuit leg 202 and the second circuit leg 204 operate in parallel to provide a watchdog functionality for the operation of the heater device 6. Both circuit legs 202,204 are responsive to the temperature sensor 18 detecting a temperature at the heater device 6 which is above the predetermined temperature threshold that is considered to define an upper safe limit for the heater device. If the temperature signal does exceed the predetermined threshold, the change in state of output signals propagates through the comparators and AND gates to disable the switching circuits 214,234 and de-energise the relay. Simultaneously, the state-change latching devices 212,232 in each of the first and second circuit legs 202,204, respectively, are operated in response to the state change from the comparator modules 210,230 in order to latch their respective enable/disable signals 239,244 into the disable state and thereby lock the appliance 2 in a non-working safe state. Therefore, even if the temperature reduces to an acceptable level, the latched enable/disable signal 239,244 issued by the state-change latching devices 212,232 will ensure that operation of the appliance 2 will not be possible.

Figure 4:
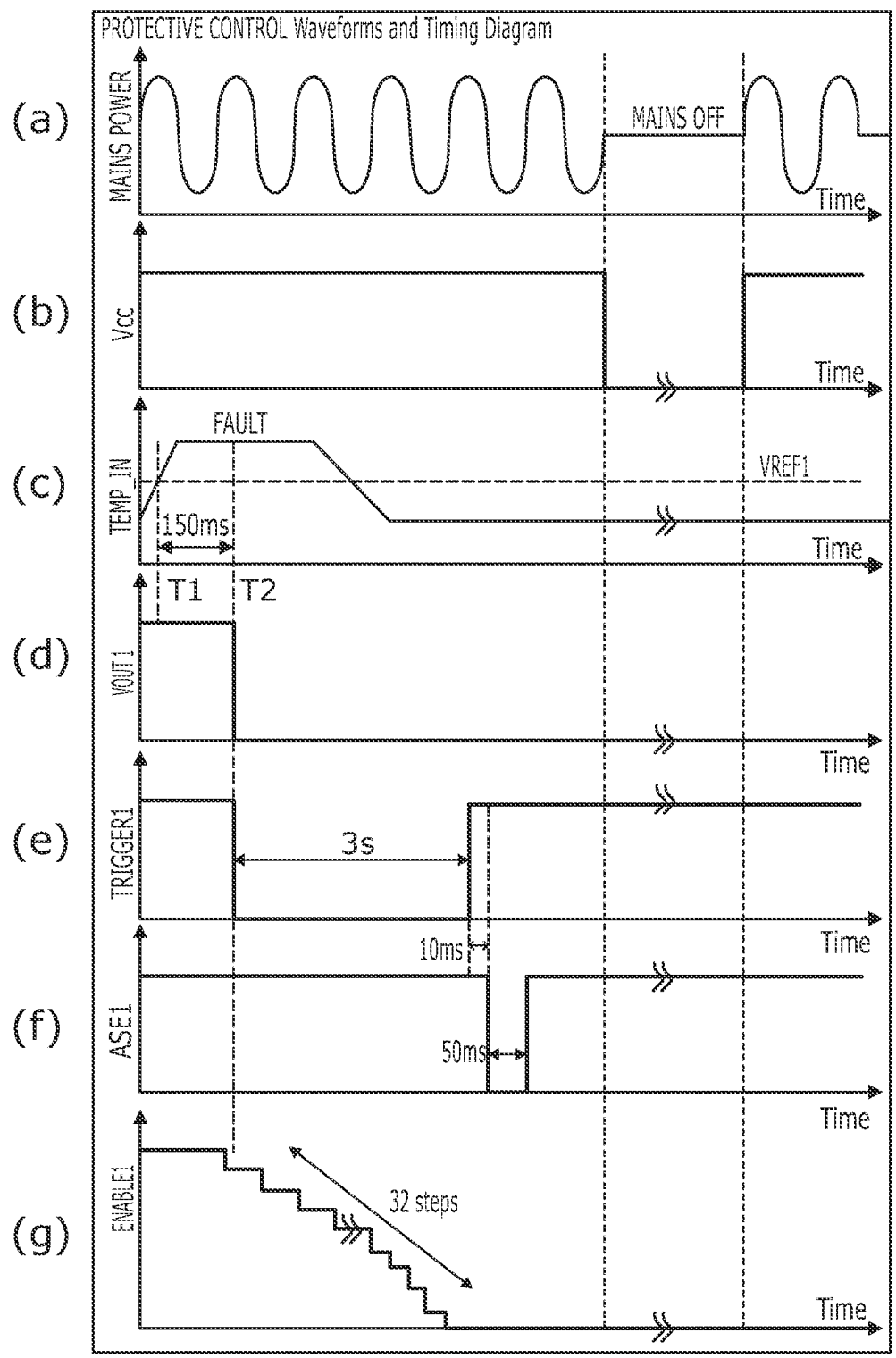
FIG. 4 is a timing diagram that illustrates the operation of the circuit configuration shown in FIG. 2.

FIG. 4 illustrates a series of timing diagrams or waveforms for various signals within the protection circuit of FIG. 2 and FIG. 3. In respect of FIG. 3, the timing diagram relates to componentry in the first circuit leg 202, but it will be appreciated that the same information applied to the second circuit leg 204. The waveforms are labelled 4(a) to 4(g) for clarity, with waveform 4(a) indicating mains power supply to the product incorporating the heater device 6; waveform 4(b) indicating the voltage supplied to the relay;

waveform 4(c) indicating the temperature profile detected by the temperature sensor 18; waveform 4(d) indicating the voltage of the output signal 22 from the comparator module 10;210; waveform 4(e) indicating the trigger signal generated by the control module 32;213; waveform 4(f) indicating the voltage on the ASE pin of the state-change latching device; and waveform 4(g) indicating the status of the enable/disable signal 31;239 from the state-change latching device 30;212 to the comparator module 10;210.

Referring firstly to waveform 4(c) it will be seen that the temperature starts off at t=0 at a value below the predetermined threshold, as indicated by the dashed line labelled VREF1, and rises to cross that threshold at t=T1. Due to the filtering applied by the filter element 247, there is a 150 ms time period before any signal transitions take place. At t=T2, as can be seen in waveform 4(d) the voltage at the switch device 12;214 transitions from logic high to logic low. Also, as shown in waveform 4(e), at t=T2 the negative pulse is generated by the negative pulse generator 132. As discussed above, the negative pulse is generated for a period of 3 seconds, which results in the enable/disable signal 31;239 being drawn down in a step-wise manner from its highest value to its lowest value, as shown in waveform 4(g).

Once the 3-second negative pulse has finished, the negative pulse transitions back to logic high, at which point the delay block 134 implements a 10 ms delay period before the second negative pulse generator 136 generates a short negative pulse of 50 ms at the ASE pin of the state-change latching device 30;212, which causes the wiper position of the state-change latching device 30;212 to be stored in NVM.

The functionality can be further appreciated by considering waveforms 4(a) and 4(b), which show the mains power from the wall plug and the circuit voltage Vcc, respectively. As can be seen the mains power terminates which also terminates the positive circuit voltage Vcc, and this represents the user turning off the appliance at the wall plug as a safety measure once they have realised the appliances has tripped out. As can be seen, when the mains power is re-established, which also re-established the circuit voltage Vcc, this does not change the state of the enable/disable signal of the state-change latching device, despite the temperature being at a safe level, as can be seen by comparing waveforms 4(a), 4(d) and 4(g).

The skilled person will appreciate that the circuit configurations described above with reference to FIGS. 1 to 4 are examples which achieve a hardware implementation of single-operation latching switch circuit for an appliance, optionally with single fault tolerance. A single operation latching device is a device that remains latched even after a power cycled operation. For completeness, a further example configuration of a protection circuit 300 will now be described with reference to FIG. 5.

Figure 5:
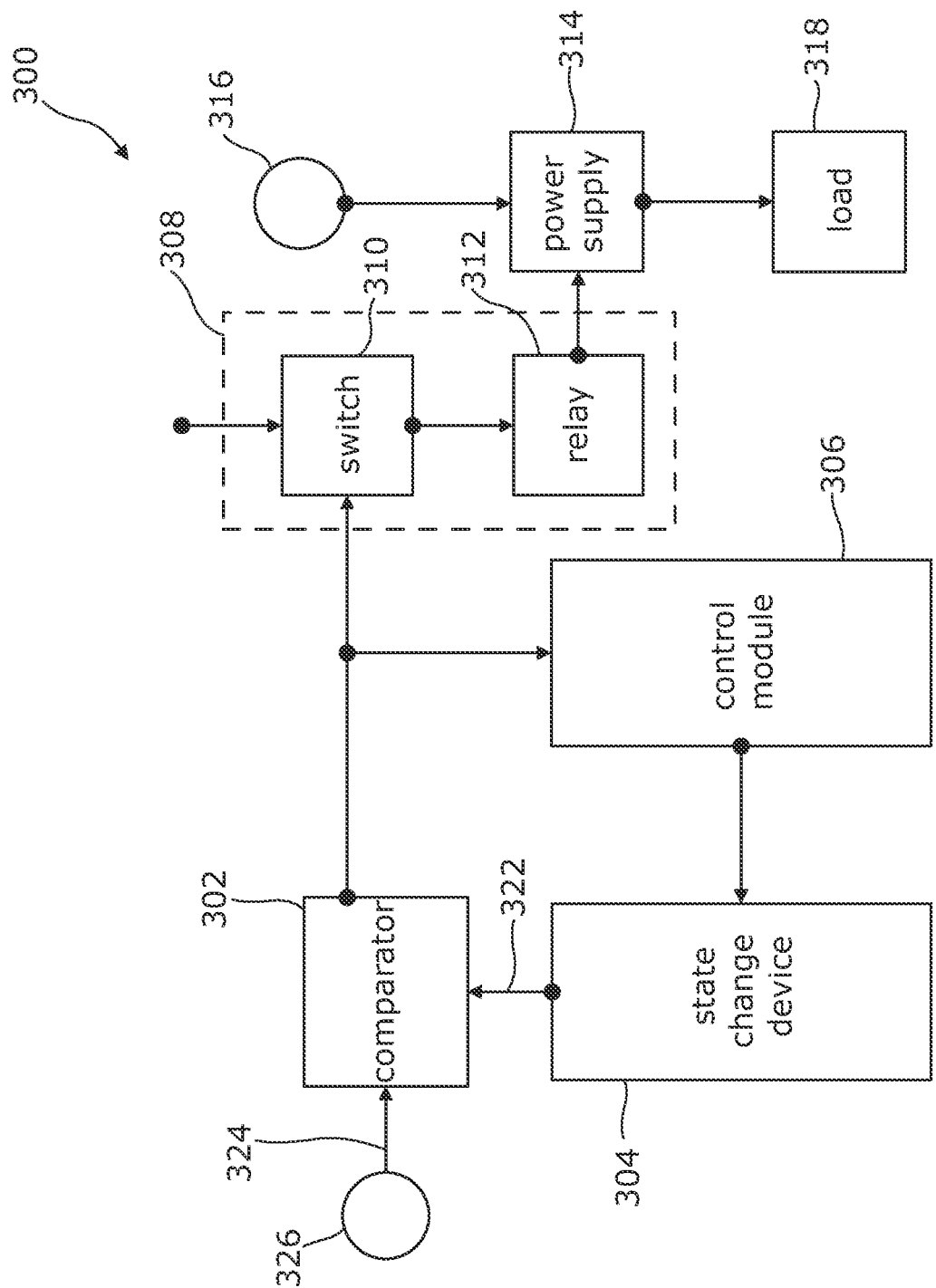
FIG. 5 is a schematic diagram of another example of a circuit configuration that provides comparable functionality to the circuit configuration shown in FIGS. 1-3.

FIG. 5 shares some commonality with the circuit configurations in FIGS. 1 to 3, so only the differences will be described here so as not to obscure the fundamental operating principles.

In a similar way to the example circuit configurations of FIGS. 1 to 3, the protection circuit 300 includes a comparator module 302, a state-change latching device 304 and an associated control device 306, those components controlling the operation of a switching circuit 308. As in the previous examples, the switching circuit 308 includes a switch device 310 which controls the energisation of a relay 312 which, in turn, controls the operation of a power supply 314 which regulates the flow of power from a main power source 316 to a component 318 of the appliance.

Notably, in this embodiment, the state-change latching device 304 issues an enable disable signal 322 to the comparator module 302, but it is the enable/disable signal which acts as the voltage reference with which the comparator module 302 compares against a measured temperature signal 324 received from temperature sensor 326.

As in the previous examples, the state-change latching device 304 is embodied as a digital potentiometer (digipot) and the enable/disable signal 322 is the output of the wiper pin of the digipot. As the digipot provides the voltage reference used by the comparator module 302, that voltage value must be precise to ensure correct comparison with the temperature sensing signal. Therefore, it is preferred that the digipot is configured with a wiper having 256 steps to provide a suitable resolution for the voltage reference.

The control device 306 and the switching circuit 308 operate in the same way as discussed with reference to the previous examples, so further discussion will not be provided. It will therefore be appreciated that this example has a simpler implementation with fewer logic components.

Having described above different examples of circuit configurations and some variants thereof, the skilled person would understand that modifications may be made to those circuit configurations without departing from the inventive concept as defined in the claims.

The circuit configurations discussed above have the advantage that the cut-out functionality is implemented as a hardware solution which provides an extremely compact package. The skilled person will appreciate that the protection circuits discussed here function on a one-time basis and are not resettable by a user so the purposes of ensuring that the appliance is kept in a safe state. Conveniently, however, the protection circuits can be configured such that they are able to be tested and reset in a factory setting. One way in which the protection circuits could be reset is for a PU pin (or 'pull-up pin') of the digital potentiometers to be energised by an external testing interface. This action will pull up the wiper position to its highest level, thereby setting the enable/disable signal back into the enable state. Once the wiper pin Rw is back at its highest level, the ASE pin of the digital potentiometer can be energised for a required time period in order to save the new wiper position.

The invention claimed is:

1. A protection circuit for an electric appliance, comprising:
   a first comparator module configured to compare an operating parameter input signal to a threshold value and to output a first control signal to a first switching circuit configured to control power flow to an associated electrical component,
   wherein the first comparator module is configured to receive an enable/disable signal from a first state-change latching device,
   wherein the first state-change latching device is responsive to a state change of the first control signal from the first comparator module, in response to which the state-change latching device changes the enable/disable signal from an enable state to a disable state thereby to set the first control signal into an off state and thereby lock the appliance in a non-working safe state.

2. The protection circuit of claim 1, wherein a control module monitors the first control signal of the first comparator module and outputs a triggering input to the state-change latching device that is responsive to the state of the first control signal.

3. The protection circuit of claim 2, wherein the first state-change latching device includes a latching mechanism that is activated by the triggering input.

4. The protection circuit of claim 3, wherein the latching mechanism is configured to change state upon detecting the triggering input being in a triggering state for a predetermined time period.

5. The protection circuit of claim 3, wherein the first state-change latching device includes a memory module that saves the state of the latching mechanism.

6. The protection circuit of claim 5, wherein the control module controls the memory module to save the state of the latching mechanism by outputting a save input of a predetermined duration whereby once the state of the latching mechanism is saved in the memory module, the appliance will remain in a non-working state even after the appliance is power cycled.

7. The protection circuit of claim 1, wherein the first state-change latching device is a digital potentiometer.

8. The protection circuit of claim 1, wherein the first comparator module includes a comparator that outputs a logic high signal to a first logic element when the operating parameter input signal exceeds the threshold value, and wherein the first logic element outputs the first control signal as a logic high state when the first comparator output signal and the enable/disable signal are the same logic state.

9. The protection circuit of claim 1, wherein the first comparator module includes a comparator that outputs the first control signal as a logic high state when the operating parameter input signal exceeds the threshold value.

10. The protection circuit of claim 9, wherein the threshold value is provided by the enable/disable signal of the first state-change latching device when that signal is in an enable state.

11. The protection circuit of claim 1, further comprising:
a second comparator module configured to receive the operating parameter input signal and to compare operating parameter input signal to a threshold value and, in response, to output a second control signal to a second switching circuit configured to control power flow to the associated electrical appliance,
wherein the second comparator module is configured to receive a second enable/disable signal from a second state-change latching device,
wherein the second state-change latching device is responsive to a state change of the second control signal from the second comparator module, in response to which the second state-change latching device changes the second enable/disable signal from an enable state to a disable state thereby to lock the second control signal into an off state.

12. The protection circuit of claim 11, wherein the first switching circuit is connected to a power control relay, and wherein the power control relay is connected to a power supply.

13. The protection circuit of claim 12, wherein the second switching circuit is connected to the power control relay.

14. The protection circuit of claim 13, wherein the power control relay is configured to disable the power supply when one or both the first switching circuit and the second switching circuit operate to de-energise the relay.

* * * * *